(12) United States Patent
Dixon

(10) Patent No.: US 10,002,355 B1
(45) Date of Patent: Jun. 19, 2018

(54) LICENSED MEDIA IN A REMOTE STORAGE MEDIA CONSUMPTION SERVICE

(75) Inventor: Scott Dixon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 789 days.

(21) Appl. No.: 13/276,897

(22) Filed: Oct. 19, 2011

(51) Int. Cl.
*G06Q 20/40* (2012.01)
*G06Q 20/32* (2012.01)

(52) U.S. Cl.
CPC ....... *G06Q 20/401* (2013.01); *G06Q 20/3224* (2013.01)

(58) Field of Classification Search
USPC ............................................. 705/51, 59, 77
See application file for complete search history.

(56) References Cited

U.S. PATENT DOCUMENTS

| | | | |
|---|---|---|---|
| 6,192,340 B1 | 2/2001 | Abecassis | |
| 6,496,802 B1 | 12/2002 | Van Zoest et al. | |
| 6,600,898 B1 | 7/2003 | De Bonet et al. | |
| 6,973,476 B1 | 12/2005 | Naden et al. | |
| 6,983,371 B1* | 1/2006 | Hurtado | G06F 21/10 380/255 |
| 7,822,687 B2 | 10/2010 | Brillon et al. | |
| 8,059,646 B2 | 11/2011 | Svendsen et al. | |
| 8,086,536 B2* | 12/2011 | Dublish | G06F 21/10 380/201 |
| 8,315,950 B2 | 11/2012 | Conley et al. | |
| 8,332,887 B2 | 12/2012 | Dion et al. | |
| 8,413,189 B1 | 4/2013 | Parekh et al. | |
| 2003/0050058 A1 | 3/2003 | Walsh et al. | |
| 2005/0044411 A1* | 2/2005 | Somin | H04L 67/104 726/4 |
| 2005/0119936 A1* | 6/2005 | Buchanan | G06F 17/30035 705/14.55 |
| 2006/0195521 A1 | 8/2006 | New et al. | |
| 2008/0046922 A1 | 2/2008 | Jankins et al. | |
| 2008/0288365 A1* | 11/2008 | Fisher, III | G06Q 20/1235 705/26.8 |

(Continued)

OTHER PUBLICATIONS

*Theme*Time* date unknown [per:http://www.notdarkyet.org/tt-cats.html, at least Jan. 9], notdarkyet.org, http://www.notdarkyet.org/themetime.html, http://www.notdarkyet.org/tt-cats.html.

(Continued)

*Primary Examiner* — Tsan-Yu J Huang
(74) *Attorney, Agent, or Firm* — Thomas Horstemeyer, LLP

(57) ABSTRACT

Disclosed are various embodiments for facilitating a payment to an owner of a media file for enabling the consumption of the media file. In one embodiment, a jukebox service transmits a plurality of media files to a plurality of users for consumption, wherein the media files are served up from a plurality of cloud drives associated with the users. A license service determines whether the consumption comprises at least one of a download, a purchase and an execution of the media files. Then, the license service facilitates a payment to the owner of the media files if a payment is owed to the owner. In one embodiment, the payment owed to the owner may be based on the type of consumption of the media files.

20 Claims, 9 Drawing Sheets

(56) References Cited

U.S. PATENT DOCUMENTS

| | | | |
|---|---|---|---|
| 2008/0313716 A1* | 12/2008 | Park | H04L 63/104 726/4 |
| 2009/0006375 A1 | 1/2009 | Lax et al. | |
| 2009/0144273 A1 | 6/2009 | Kappos | |
| 2009/0164902 A1 | 6/2009 | Cohen et al. | |
| 2009/0271309 A1* | 10/2009 | Gordon | G06Q 40/04 705/37 |
| 2009/0327035 A1 | 12/2009 | Allard | |
| 2011/0313874 A1 | 12/2011 | Hardie et al. | |

OTHER PUBLICATIONS

Harrison, CDIA Training & Test Preparation Guide 2000, Specialized Solutions Inc., pp. 188-189.

Home [Screen capture from archive.org taken at Jun. 9, 2000; accessed on Feb. 11, 2013], cablemusic.com, Inc., http://www.web.archive.org/web/20000609024318/http://www.cablemusic.com/.

Monroe, xkcd: Password Strength date unknown [Accessed on Feb. 11, 2013], xkcd, http://xkcd.com/936/.

U.S. Appl. No. 13/247,390, filed Sep. 28, 2011, Non-Final Office Action dated May 4, 2017.

U.S. Appl. No. 13/247,390, filed Sep. 28, 2011, Patent Board of Appeal Decision mailed on Jun. 15, 2016.

U.S. Appl. No. 13/247,390, filed Sep. 28, 2011, Examiners Answer to Appeal Brief dated Feb. 13, 2014.

U.S. Appl. No. 13/247,390, filed Sep. 28, 2011, Final Office Action dated Jul. 31, 2013.

U.S. Appl. No. 13/247,390, filed Sep. 28, 2011, Response to Non-Final Office Action dated Feb. 22, 2013.

U.S. Appl. No. 13/247,390, filed Sep. 28, 2011, Non-Final Office Action dated Feb. 22, 2013.

U.S. Appl. No. 13/247,386, filed Sep. 28, 2011, Final Office Action dated Feb. 12, 2015.

U.S. Appl. No. 13/247,386, filed Sep. 28, 2011, Response to Non-Final Office Action dated Oct. 28, 2014.

U.S. Appl. No. 13/247,386, filed Sep. 28, 2011, Non-Final Office Action dated Oct. 28, 2014.

U.S. Appl. No. 13/247,386, filed Sep. 28, 2011, Response to Final Office Action dated May 5, 2014.

U.S. Appl. No. 13/247,386, filed Sep. 28, 2011, Final Office Action dated May 5, 2014.

U.S. Appl. No. 13/247,386, filed Sep. 28, 2011, Response to Non-Final Office Action dated Dec. 16, 2013.

U.S. Appl. No. 13/247,386, filed Sep. 28, 2011, Non-Final Office Action dated Dec. 16, 2013.

U.S. Appl. No. 13/247,386, filed Sep. 28, 2011, Response to Final Office Action dated Jun. 27, 2013.

U.S. Appl. No. 13/247,386, filed Sep. 28, 2011, Final Office Action dated Jun. 27, 2013.

U.S. Appl. No. 13/247,386, filed Sep. 28, 2011, Response to Non-Final Office Action dated Feb. 15, 2013.

U.S. Appl. No. 13/247,386, filed Sep. 28, 2011, Non-Final Office Action dated Feb. 15, 2013.

U.S. Appl. No. 13/247,390, filed Sep. 28, 2011, Final Office Action dated May 4, 2017.

U.S. Appl. No. 13/247,390, filed Sep. 28, 2011, Response to Final Office Action dated May 4, 2017.

U.S. Appl. No. 13/247,390, filed Sep. 28, 2011, Advisory Office Action dated Nov. 15, 2017.

U.S. Appl. No. 13/247,390, filed Sep. 28, 2011, Notice of Allowance dated Jan. 19, 2018.

\* cited by examiner

LICENSED MEDIA IN A REMOTE STORAGE MEDIA CONSUMPTION SERVICE

BACKGROUND

Users may store a variety of files on a hard drive of a personal computer, such as, documents, audio files, and video files. Each of the users may then access their respective hard drives for consuming the files. For example, the user may access the hard drive of the personal computer to view the document, listen to the audio file, and watch the video file.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to transmitting a plurality of files of a plurality of file systems associated with a corresponding plurality of users to each one of the users. In one embodiment, a jukebox service is executed to identify a plurality of files from the file systems associated with each user requesting to consume streamed or otherwise transmitted content. In one embodiment, the jukebox service identifies the files based in part on a plurality of disc jockey preferences provided by a disc jockey. The jukebox service then generates a jukebox playlist of the identified files having an order that is generated based at least upon a playback profile associated with each one of the files. For instance, the playback profile may describe a playback frequency of the respective file. The jukebox service may then transmit the files over a network to clients of requesting users according to the order established by the jukebox playlist. In addition, a license service facilitates at least one payment to intellectual property owners of the files transmitted to the users as needed. In the following discussion, a general description of the system and its components is provided, followed by a discussion of the operation of the same.

Figure 1:
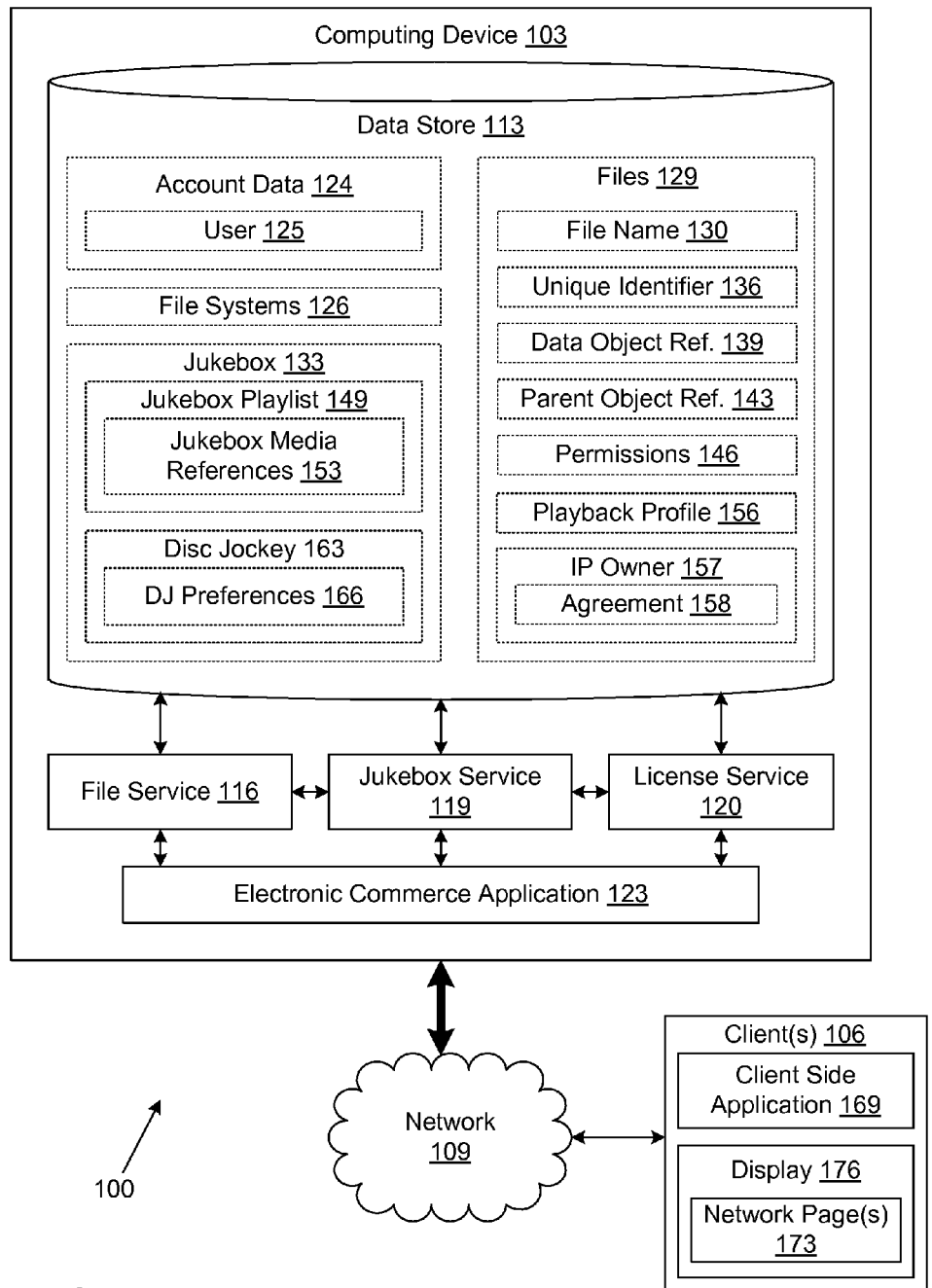
FIG. 1 is a drawing of networked environment according to various embodiments of the present disclosure.

With reference to FIG. 1, shown is a networked environment 100 according to various embodiments. The networked environment 100 includes a computing device 103, a client device 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include a file service 116, a jukebox service 119, a license service 120, an electronic commerce system 123, and other applications, services, processes, systems, engines, or functionality not discussed in detail herein. The file service 116 is executed to maintain an organization of files and folders in file systems associated with service accounts. To this end, the file service 116 may support various file-related operations such as, for example, creating files, deleting files, modifying files, setting permissions for files, downloading data files, and/or other operations. The jukebox service 119 is executed to facilitate the transmitting or transmitting of media to a consuming audience at the direction of a disc jockey. To this end, the jukebox service 119 may support various media-related operations such as, for example, identifying media files, determining a media file playback profile, and generating a playlist comprising media files taking into account a playback profile associated with each of the media files. The license service 120 determines whether a payment is owed for a copyright holder and/or licensor of the respective consumed media files and facilitates the payment thereof.

The electronic commerce system 123 is executed in order to facilitate the online purchase of items over the network 109. The electronic commerce system 123 also performs various backend functions associated with the online presence of a merchant in order to facilitate the online purchase of items. For example, the electronic commerce system 123 generates network pages 173 such as web pages or other types of network content that are provided to clients 106 for the purposes of selecting items for purchase, rental, download, lease, or other form of consumption as will be described.

The other applications executed on the computing device 103 correspond to hosted applications that may access the data stored in the file system. Various other applications may, for example, have a web-based interface that may serve up network pages, such as web pages or other forms of network content, to facilitate user interaction. Other applications may include internal applications that may not have a web-based interface. For example, the other applications may include media organizing tools, media consuming tools, word processors, email applications, and/or other applications.

The data stored in the data store 113 includes, for example, account data 124, file systems 126, files 129, jukebox 133, and potentially other data. The account data 124 includes various data associated with file service accounts including data regarding authorized user(s) 125 of the computing device 103. In addition, account data 124 may also include usernames, passwords, security credentials, file management permissions, storage quotas and limitations, authorized applications, purchasing information, payment instrument information, billing information, and/or other data.

The file systems 126 correspond to logical file organizations that are maintained within the computing device 103 on behalf of one or more authorized users associated with a file service account. For instance, each file system 126 may represent a storage bucket in which various files 129 are stored. In various embodiments, the logical file organizations embodied in the file systems 126 are abstractions that do not directly correspond to any particular physical storage arrangements such as disk drives, portable storage media, etc. A file service account may be associated with one or more file systems 126. Each account-level user may have its own file system 126, or the file systems 126 may be shared by multiple account-level users.

Each file system 126 may include one or more files 129. A file 129 may include a file name 130, a unique identifier 136, a data object reference 139, a parent object reference 143, one or more permissions 146, a file creation date, a file modification date, and/or other data. The file name 130 may correspond to a human-readable character string that identifies the contents of the file 129. In one embodiment, the file name 130 may be limited in character length and may be limited in terms of allowed characters. In some cases, such limitations may be enforced for compatibility reasons. In addition, the file name 130 may be restricted to being unique to a folder and/or a file system 116 in various embodiments. In one embodiment, a file 129 may comprise a document and/or a media file, such as, for instance, an audio file (e.g. a song), a video file, and/or any other type of media file.

The unique identifier 136 corresponds to a number, character string, or other identifier that uniquely identifies the file 129 across the file system 126 and/or all of the file systems 126. In one embodiment, the unique identifier 136 of a file 129 coupled with an identifier of a file system 126 may correspond to an identifier that is unique across all of the file systems 126. In another embodiment, the unique identifier 136 of a file 129 may itself be unique across all of the file systems 126.

The data object reference 139 corresponds to a reference that may identify a data object associated with the file 129 that is stored in a data store such as the data store 113. In one embodiment, the data object reference 139 may include a key value for obtaining the data object. The data stored from which to obtain the data object may be determined implicitly or explicitly, for example, from a definition in the data object reference 139. The parent object reference 143 corresponds to a reference that may identify a folder or file 129 that is considered to be the parent of the file 129. In this way, the folders are associated with files 129. In some situations, the parent object reference 143 may include a special identifier, such as, for example, NULL and/or 0, that identifies the root of the file system 126.

The permissions 146 may correspond to access permissions and security policies associated with the file 129. For example, a user may be designated as a file owner, and a group of users may be designated as a file group. In such an example, read or write access may be enabled or disabled as it applies to the user, the group of users, and/or all users. Similarly, access to a file 129 may be enabled or disabled as it applies to a file service account, a group of file service accounts, and/or all file service accounts. In another embodiment, each file 129 may also have an associated metadata that describes the content of the file 129. For example, the metadata may comprise text that includes keywords describing the content and/or type of file 129.

The playback profile 156 provides a playback description of the file 129 with respect to the user 125. For instance, the playback profile 156 may describe a playback frequency, a cumulative number of playbacks, a time of day the file 129 is commonly played back, and/or any other attribute that describes the playback of the file 129. The intellectual property (IP) owner 157 represents the identity of a copyright owner and/or a licensor of the respective file 129. In one embodiment, the IP owner 157 may include identifying information and payment information for a plurality of modes of payment, as can be appreciated. Finally, the agreement 158 indicates a type of license agreement under which the IP owner 157 provides the file 129 for consumption.

The jukebox 133 corresponds to information that is associated with providing a cloud jukebox experience, as will be described. For example, the jukebox 133 includes a jukebox playlist 149 that lists a plurality of jukebox media references 153. In one embodiment, each of the jukebox media references 153 may be a reference and/or a pointer to a file 129 of a file system 126. In addition, the jukebox 133 includes a disc jockey 163 that identifies a user 125 charged with managing the jukebox experience, as will be described. Finally, the disc jockey preferences 166 identify a plurality of preferences established by the disc jockey 163 for managing the jukebox playlist 149.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a client side application 169 and/or other applications. The client side application 169 may be executed in a client 106, for example, to access and render network pages, such as web pages, or other network content served up by the computing device 103 and/or other servers. To this end, the client side application 169 renders network pages 173 on the display 176. Network pages 173 indicating content (e.g. files 129) of a file system 126 can include media. In one embodiment, the client side application 169 is integrated with an operating system of the client 106 to provide access to the file system 126 similarly to a mounted file system of the client 106. The client 106 may be configured to execute applications beyond the client side application 169 such as, for example, email applications, instant message applications, and/or other applications.

Next, a general description of the operation of the various components of the networked environment 100 is provided. To begin, a user may desire to establish a cloud jukebox environment for transmitting media to a plurality of users, wherein the media being transmitted is stored in a plurality of file systems, each one being associated with a respective one of the users. For instance, a user may wish to invite a number of other users to a party, a social event, and/or any other type of gathering where the attendees can listen to music found on file systems associated with the other attendees. In one embodiment, a jukebox service 119 may identify media files 129 available from each attending user's file system 126 and generate a jukebox playlist 149 for transmitting the user media files 129. A disc jockey may then manage the jukebox 133 and the jukebox playlist 149 according to a plurality of disc jockey preferences 166, as will be described. In addition, the consuming users 125 may also participate in the management of the jukebox 133, as will be described.

In another embodiment, a media promoter may desire to micro-target an audience of users for promoting media. For instance, a music promoter may wish to micro-target an audience based on a characterization of the type of the music that the audience consumes and promote new music to that audience. As an example, the music promoter may wish to promote new music that is similar to, or of the same genre as, the music being consumed by the audience. Further, the media promoter may reward a user that consumes the promoted media with a credit that may be redeemable for purchasing and/or otherwise owning a plurality of other media files 129, as will be described.

To begin, a user may create a jukebox 133 via a jukebox service 119 for transmitting files 129 referenced by jukebox media references 153 over the network 109 to users 125 on a plurality of client devices 106 for consumption. For instance, the jukebox service 119 may transmit, stream, broadcast, and/or communicate the files 129 in any other way to the clients 106, as can be appreciated. The jukebox service 119 may build a listing of jukebox media references 153 that make up a jukebox playlist 149, and identify a disc jockey 163 for managing the jukebox 133. In addition, the jukebox service 119 may provide for a plurality of users 125 consuming the transmitted files 129 to participate in selecting a disc jockey 163, and determining an order for the jukebox playlist 149, as will be described.

On a first access, the jukebox service 119 prompts a user 125 to create the jukebox 133 by providing one or more parameters for establishing the jukebox 133. For instance, the jukebox service 119 may prompt the user 125 to indicate a name for the jukebox 133, a date and time for initiating the jukebox 133, a duration for which the jukebox 133 may transmit the files 129, a preference for determining a disc jockey 163 to manage the jukebox 133, and/or any other parameter for establishing the jukebox 133. In another embodiment, the jukebox service 119 may also prompt the user 125 to indicate a location for the jukebox 133. For instance, the jukebox service 119 may transmit files 129 to reach a predetermined radius with respect to the specified location.

In one embodiment, the jukebox service 119 may then invite a plurality of users 125 to consume the media that is transmitted from the jukebox 133, as will be described. In one embodiment, the jukebox service 119 may first verify that the users 125 accepting the invitations are located within the predetermined radius or distance of the specified location. For example, verification using a quick response code, a location based approach, a protected passphrase, and/or any other verification approach may be used as can be appreciated. As a further example, the jukebox service 119 may use a verification approach as described in U.S. patent application Ser. No. 13/217,324, which is incorporated herein by reference in its entirety. Further, upon accepting the invitation, the jukebox service 119 may then request access to one or more file systems 126 associated with each of the users 125 accepting the invitation. For instance, the jukebox service 119 may request access to the files 129 in the file system 126 of each of the users 125 accepting the invitation. In another embodiment, the jukebox service 119 may request access to files in a file system located in the client 106 with which the user 125 may be in electronic communication with the jukebox service 119. For instance, the jukebox service 119 may access files located on a local drive of the client 106. Once the jukebox service 119 has been granted access to the files 129, the jukebox service 119 may then determine that the user 125 is in electronic communication with the jukebox service 119.

Next, the jukebox service 119 may then determine a disc jockey 163 to manage the jukebox 133 by selecting from one of the users 125 that is in electronic communication with the jukebox service 119. In one embodiment, as an initial setting, the jukebox service 119 may select the user 125 that created the jukebox 133 to serve as the disc jockey 163. In another embodiment, the user 125 creating the jukebox 133 may specify that the jukebox service 119 select another user 125 to serve as the disc jockey 163. For instance, the jukebox service 119 may select a user 125 in electronic communication with the jukebox service 119 to serve as the disc jockey 163 based on a variety of approaches. As an example, the jukebox service 119 may select the disc jockey 163 based on a vote by all of the users 125 in electronic communication with the jukebox service 119, a round robin style selection of one of the users 125, and/or any other approach for selecting a disc jockey 163 from one of the users 125. In another embodiment, the jukebox service 119 may not select any user 125 to serve as the disc jockey 163 and instead automate the functions of the disc jockey 163.

Having selected a disc jockey 163, the jukebox service 119 then prompts the disc jockey 163 to provide a plurality of disc jockey preferences 166 for identifying the jukebox media references 153 to files 129 that are to be transmitted with the jukebox service 119. In one embodiment, the jukebox service 119 identifies the jukebox media references 153 based on the files 129 in the file systems 126 associated with each one of the users 125 in electronic communication with the jukebox service 119. For example, the files 129 may be music files, video files, and/or any other type of media file. In one embodiment, the disc jockey 163 may be prompted to provide disc jockey preferences 166 for identifying a plurality of files 129 to include in the listing of jukebox media references 153. Using the example of transmitting music from above, the disc jockey preferences 166 may include a genre of music, one or more artist names, a popularity and/or a star rating of a song, an age range of a user 125 from whose file system 126 the jukebox service 119 may identify files 129, and/or any other type of disc jockey preference 166. In one embodiment, the user 125 creating the jukebox 133 may provide the preferences for identifying jukebox media references 153. For instance, in the embodiment where no disc jockey 163 is identified, the user 125 creating the jukebox 133 may provide the relevant preferences for identifying the jukebox media references 153.

In another embodiment, the jukebox service 119 may automatically determine the disc jockey preferences 166 based on a variety of factors. For instance, the jukebox service 119 may identify the jukebox media references 153 to the files 129 of the users 125 according to a sales velocity of a song, an album, and/or any other product by an artist. As another example, the jukebox service 119 may also identify the jukebox media references 153 based on one or more popularity rankings, critical reviews, and/or any other criteria as can be appreciated.

In one embodiment, the jukebox service 119 may also provide for the disc jockey 163 to preclude identifying files 129 from a file system 126 of users 125 that satisfy one or more disc jockey preferences 166. For instance, disc jockey 163 may indicate that any file systems 126 of users 125 outside of a specified age range should be excluded when identifying the files 129. Having received the disc jockey preferences 166, the jukebox service 119 may then identify the files 129 from the file systems 126 of each of the users 125 in electronic communication with the jukebox service 119. In one embodiment, the jukebox service 119 may identify the files 129 that correspond with the disc jockey preferences 166. For instance, the jukebox service 119 may examine a metadata associated with each of the files 129 to determine the content of the file 129. Then, the jukebox service 119 may identify a file 129 for consumption if the metadata describing the file 129 corresponds with one or more of the disc jockey preferences 166. In one embodiment, the jukebox service 119 may generate a listing of all files 129 that correspond with the disc jockey preferences 166 to create the jukebox media references 153. Additionally, according to another embodiment, the jukebox service 119 may identify files 129 for consumption based on a preferences list associated with each of the users 125, a consumption history associated with each of the users 125, and/or any other listing of songs associated with each of the users 125. For example, the jukebox service 119 may identify the files 129 from a list of media files indicated in a social media profile of the user 125.

Next, the jukebox service 119 may then generate a jukebox playlist 149 according to a playback profile 156 of each of the files 129 referenced by the jukebox media references 153. In one embodiment, the playback profile 156 may describe a frequency of playback of each of the files 129 referenced by the jukebox media references 153, a cumulative number of playbacks for each referenced file 129, a time of day each of the referenced files 129 is commonly played back, a cumulative number of times each referenced file 129 appears in a file system 126 associated with one of the users 125, a cumulative number of times each referenced file 129 is marked as a 'favorite' by each of the users 125, and/or any other factor that describes the playback of the files 129 referenced by the jukebox media references 153. In one embodiment, the jukebox service 119 may determine the playback profile 156 according to a statistical analysis of the files 129 referenced by the jukebox media references 153, as can be appreciated.

Having determined the playback profile 156, the jukebox service 119 generates the jukebox playlist 149 according to the playback profile 156 of each one of the files 129 referenced by the jukebox media references 153. In one embodiment, the jukebox service 119 may order the jukebox media references 153 such that the appearance of a jukebox media reference 153 in the ordered jukebox playlist 149 corresponds to the playback frequency of the referenced file 129, a cumulative number of times the referenced file 129 appears in the file systems 126 associated with the users 125, a cumulative number of times the referenced file 129 is marked as a 'favorite,' and/or any other attribute of the playback profile 156.

In another embodiment, the jukebox service 119 may generate the jukebox playlist 149 based upon a combination of the attributes comprising the playback profile 156. For example, the jukebox service 119 may order the jukebox media references 153 according to an average rating for each referenced file 129 given by the users 125 and a time of day each referenced file 129 is most frequently played back. Thus, the jukebox service 119 may generate a jukebox playlist 149 that includes highly rated songs according to the users 125 that are frequently played during a time period that the jukebox service 119 is scheduled to transmit the referenced files 129, such as, for example, a Friday evening between 9 PM and 11 PM.

In one embodiment, the jukebox service 119 may provide for the disc jockey 163 to adjust the jukebox playlist 149 as desired. For example, the disc jockey 163 may dislike a particular jukebox media reference 153 pointing to a referenced file 129. In this example, the jukebox service 119 may facilitate removal of the disliked jukebox media reference 153 from the jukebox playlist 149 by the disc jockey 163. Additionally, the jukebox service 119 may also provide for the disc jockey 163 to add new jukebox media references 153 to the jukebox playlist 149, reorder existing jukebox media references 153 in the jukebox playlist 149, and/or otherwise adjust the jukebox playlist 149 in any other manner.

In another embodiment, the jukebox service 119 may also provide for the disc jockey 163 to insert a placeholder into the jukebox playlist 149 for transmitting a file 129 referenced by a jukebox media reference 153 to be determined at a later time. The disc jockey 163 may then allow the users 125 consuming the transmitting media to vote and/or otherwise indicate a particular jukebox media reference 153 pointing to a file 129 to be transmitted at the placeholder position in the jukebox playlist 149. In one embodiment, the disc jockey 163 may provide one or more parameters for selecting the jukebox media reference 153 pointing to a file 129 that is transmitted at the placeholder position, such as, for example, a genre, an artist, and/or any other type of parameter.

In one embodiment, the jukebox service 119 may provide for the users 125 consuming the referenced files 129 being transmitted by the jukebox service 119 to participate in managing the jukebox playlist 149. For example, the jukebox service 119 may provide for the users 125 to vote on new jukebox media references 153 to be added to the jukebox playlist 149, to request a specific jukebox media reference 153 to be transmitted by the jukebox 133, to request an alternate disc jockey 163, and/or any other activity for managing the jukebox playlist 149.

Next, a media promoter may desire to micro-target audiences for promoting new media using the jukebox service 119. For instance, using the music example from above, a music promoter may micro-target a listening audience based on the characterization to promote new music. In one embodiment, the jukebox service 119 may determine a characterization of the files 129 consumed by a listening audience of users 125 based on the files 129 being transmitted by the jukebox service 119, as will be described. The jukebox service 119 may then identify new music to promote to the users 125 that aligns with the characterization. Then, the jukebox service 119 may include the new music as new jukebox media reference 153 in the jukebox playlist 149 pointing to new referenced files 129 scheduled for transmitting by the jukebox service 119. In addition, the jukebox service 119 may incentivize the users 125 for listening to the new music by crediting the users 125 with redeemable units for purchasing items through an electronic commerce system 123, such as, for instance, new media files 129 unlicensed with respect to the user 125, as will be described. Further, the jukebox service 119 may provide this functionality for the media promoter for a fee.

In one embodiment, the jukebox service 119 determines the characterization of the files 129 consumed by the users 125 based at least in part on the jukebox media references 153 comprising the jukebox playlist 149. For instance, the characterization of the files 129 may describe a genre of the files 129 being consumed by the users 125, an artist most commonly appearing in jukebox playlist 149, a general tempo of the files 129 being consumed, and/or any other characterization of the referenced files 129. As an example, the jukebox service 119 may determine a general tempo (beats/min) of the referenced files 129 from a metadata that may be associated with each of the referenced files 129. For instance, the metadata may include metrics describing the file 129 that may be analyzed to determine the tempo. Additionally, in one embodiment, the jukebox service 119 may determine the characterization from the disc jockey preferences 166 used to identify the jukebox media references 153, as described above. In another embodiment, the jukebox service 119 may determine the characterization from the playback profile 156 used to generate the jukebox playlist 149, as described above. In yet another embodiment, the jukebox service 119 may determine the characterization of the files 129 based on a combination of the disc jockey preferences 166 and the playback profile 156.

Having determined the characterization of the files 129 consumed by the users 125, the jukebox service 119 may then identify promotional jukebox media references 153 for insertion into the jukebox playlist 149. In one embodiment, the jukebox service 119 identifies promotional jukebox media references 153 from the files 129 of a file system 126 associated with a media promoter. For instance, the media promoter may be a user 125 with a user account 124 having a file system 126 accessible by the jukebox service 119. In this embodiment, the jukebox service 119 may identify a promotional jukebox media reference 153 for insertion into the jukebox playlist 149 based on the characterization. For example, a promotional jukebox media reference 153 may be inserted into the jukebox playlist 149 if the file 129 referenced by the promotional jukebox media reference 153 aligns with the characterization.

In one embodiment, the jukebox service 119 may insert the promotional jukebox media references 153 at a random location in the jukebox playlist 149. In another embodiment, the jukebox service 119 may insert the promotional jukebox media references 153 at a placeholder location in the jukebox playlist 149. For example, a disc jockey 163 may insert placeholders within the jukebox playlist 149 for transmitting jukebox media files 129 to be determined at a later time, as described above. In this embodiment, the jukebox service 119 may insert the promotional jukebox media reference 153 at the placeholder location in the jukebox playlist 149.

Additionally, the jukebox service 119 may credit each of the users 125 with a redeemable credit for consuming the file 129 referenced by promotional jukebox media reference 153. In one embodiment, the redeemable credit may be monetary compensation provided by the media promoter that may be used by the users 125 for purchasing items through the electronic commerce system 123. For instance, the users 125 may purchase new files 129 that were previously unlicensed with respect to the users 125. As another example, the users 125 may purchase any other item available through the electronic commerce system 123 with the redeemable units.

In one embodiment, a user 125 may decline to consume the file 129 referenced by the promotional jukebox media reference 153. As such, the user 125 declining to consume the file 129 may not receive any redeemable credits. In another embodiment, a user 125 may request to consume a second promotional media file 129. For instance, the user 125 may transmit a request to consume a second promotional media file 129 substantially similar to the first promotional media file 129, such as, for instance, a second promotional song by the same artist performing the first promotional song. In this embodiment, the jukebox service 119 may transmit the second promotional media file 129 to the requesting user 125. Additionally, the jukebox service 119 may credit the user 125 with additional redeemable credit for consuming the second promotional media file 129.

Next, in one embodiment, the files 129 may be protected under a copyright and/or another type of intellectual property protection. For instance, the file 129 may be a song produced by an artist who is the IP owner 157 of the song. As an example, the intellectual property owned by the IP owner 157 may be a copyright that encompasses the right to reproduce, prepare derivative works, distribute, perform, display, and/or any other right provided to the copyright owner. Therefore, the IP owner 157 may desire to receive a payment and/or otherwise receive compensation for the dissemination of the file 129. For instance, the file 129 may be made publically available for download, purchase, execution, and/or other purpose at a variety of events. In one embodiment, a physical trainer may lead a group of users 125 through an exercise routine in a park where the physical trainer may manage the jukebox 133 and make available the music files 129 to the users 125, as described above. In this example, the IP owner 157 may wish to receive a payment for the file 129 being made publically available. As another example, a manager of a movie theater may transmit a movie file 129 to a group of users 125 gathered in an electronic venue to simultaneously watch the movie file 129, a disc jockey 163 simultaneously spinning music files 129 to a plurality of geographic venues may transmit the files 129 to a group of users 125 gathered at each one of the venues, and so on. In each of the above mentioned examples, the IP owner 157 of the files 129 may desire to receive a payment for the files 129 being publically available.

In one embodiment, the license service 120 stores an agreement 158 with the IP owner 157 for enabling the public consumption of the file 129 in a data store associated with the file 129. In one embodiment, the license service 120 may receive the agreement 158 from the IP owner 157 and/or another source. In another embodiment, the license service 120 may have a plurality of agreements 158 from which the IP owner 157 may choose in granting the permission to use the file 129. For instance, a variety of agreements 158 may be entered into where the IP owner 157 grants permission for the public consumption of the file 129 in exchange for a payment and/or other benefit.

As non-limiting examples, the license service 120 may facilitate a flat fee license agreement 158 where the IP owner 157 receives a one-time payment, a monthly payment, and/or other periodic payment in exchange for granting permission for the jukebox service 119 to enable the public consumption of the file 129. As other non-limiting examples, the license agreement 158 may indicate that the IP owner 157 receive a payment every predefined number of instances of the public consumption of the file 129, per instance of the public consumption 129, and/or any other frequency. As a further non-limiting example, the license agreement 158 may indicate that the IP owner 157 receive a payment based on a partial amount of the file 129 consumed by the user 125. For instance, the payment may be based on a portion of a song listened to by the user 125. Additionally, the agreement 158 may indicate that the license service 120 facilitates surfacing an advertisement and/or another item provided by the IP owner 157 in exchange for the permission to provide for the public consumption of the file 129.

Upon defining the agreement 158, the license service 120 may then execute the agreement 158 according to the terms thereof. In one embodiment, the license service 120 determines if a file 129 has been served up by the jukebox service 119 for public consumption. For instance, the license service 120 may parse the jukebox playlist 149 to identify when files 129 are served up by the jukebox service 119. As a discussed above, the jukebox playlist 149 includes a plurality of jukebox media references 153 that point to files 129 queued to be served up by the jukebox service 119. In one embodiment, the license service 120 may determine that a file 129 is served up by the jukebox service 119 for public consumption when the jukebox playlist 149 queues up the jukebox media reference 153 that corresponds to the file 129.

In one embodiment, the license service 120 may also determine a nature of the public consumption of a file 129. For instance, the jukebox service 119 may serve up the file 129 for listening, downloading, purchasing, and/or any other form of consumption. The agreement 158 under which the IP owner 157 provides access to the file 129 may indicate that the IP owner 157 receives varying amounts of compensation depending on the nature of the consumption of the file 129. For instance, the agreement 158 may indicate that the IP owner 157 receive a higher payment for a file 129 that is served up for downloading relative to payment received when served up for listening.

Next, the license service 120 determines the type of agreement 158 under which the IP owner 157 of the file 129 granted permission for the public consumption of the file 129. In one embodiment, the agreement 158 may indicate a flat fee paid to the IP owner 157, a payment upon every instance of public consumption, another frequency, and/or any other terms, as discussed above. In another embodiment, the agreement 158 may direct the jukebox service 119 to surface an advertisement to the users 125 consuming the files 129 served up by the jukebox service 119. For instance, the surfacing the advertisement to the users 125 may serve as the payment to the IP owner 157.

Having determined the type of agreement 158, the license service 120 then determines whether a payment is owed to the IP owner 157 for the public consumption of the file 129. In one embodiment, a payment may not be owed to the IP owner 157 if the agreement 158 indicates that the IP owner 157 receives a flat fee. For instance, the IP owner 157 may have already received compensation in exchange for the permission to enable the public consumption of the file 129. In another embodiment, a payment may be owed to the IP owner 157 where the agreement 158 indicates that the IP owner 157 be compensated upon every instance of public consumption of the file 129. In this example, the license service 120 may then facilitate a payment to the IP owner 157.

In one embodiment, to facilitate the payment to the IP owner 157, the license service 120 may serve up a plurality of network pages 173 that may be surfaced to the users 125 consuming the files 129. In this example, the users 125 may then be prompted to authorize a payment for the consumption of the file 129, using a suitable payment instrument. Alternatively, the users 125 may be notified of a payment made using payment instrument information previously provided, such as, for example, in initializing the account data 124 of the users 125. In another embodiment, the license service 120 may facilitate the payment to the IP owner 157 from another source, such as, for instance, a provider of the jukebox 133, an owner of the jukebox 133, a disc jockey that manages the jukebox playlist 149, and/or any other source as can be appreciated. In a further embodiment, the agreement 158 may indicate that an advertisement is to be surfaced to the users 125 on the clients 106 in exchange for providing the files 129 for consumption. In this instance, the license service 120 may facilitate an advertisement being served up to the users 125, as can be appreciated. For example, the advertisement may serve as the payment in exchange for making the file 129 publically available, as discussed above.

Figure 2:
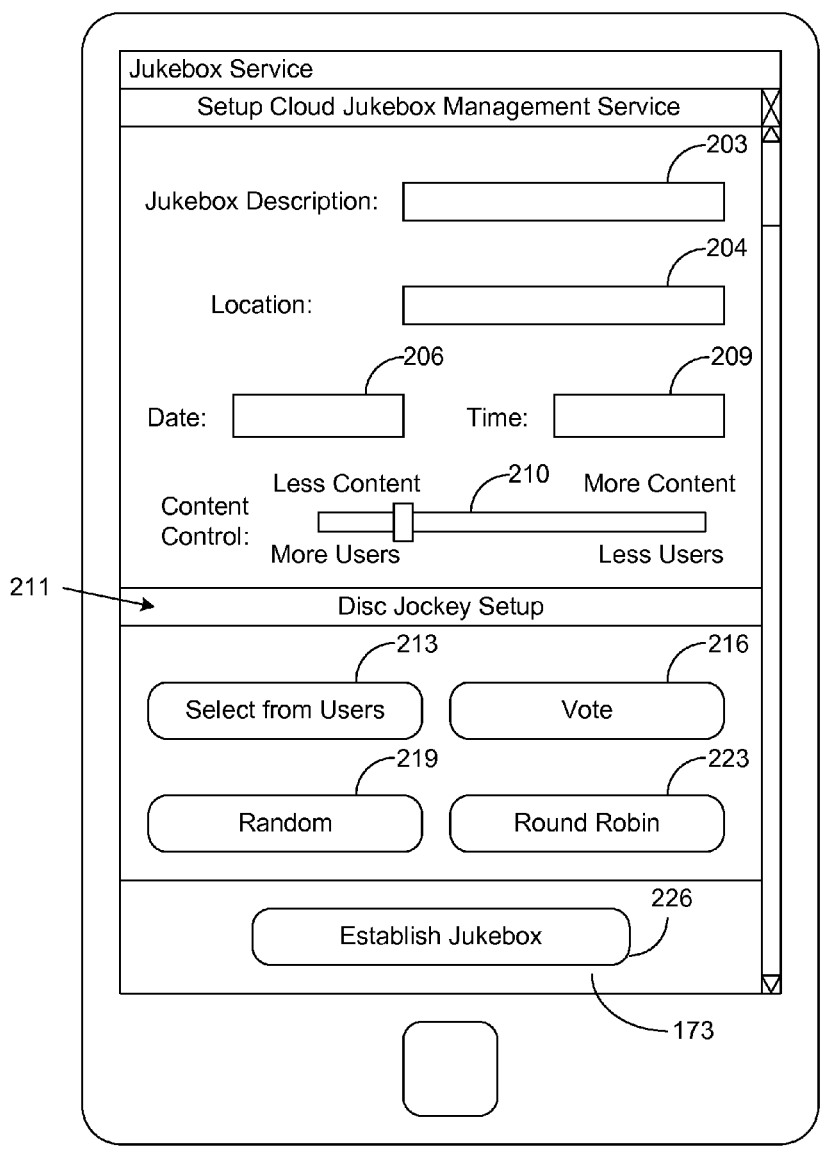
FIGS. 2-5 are drawings of an example of a user interface rendered by a client in the networked environment of FIG. 1 according to various embodiments of the present disclosure.

Referring next to FIG. 2, shown is one example of a network page 173, depicted herein as network page 173a, according to various embodiments of the present disclosure. The various graphical components such as blocks comprising information shown in FIG. 2 are merely examples of the various types of features that may be used to accomplish the specific function noted. The network page 173a is rendered on a display 176 (FIG. 1) associated with the client 106 (FIG. 1) according to various embodiments. In another embodiment, FIG. 2 may be viewed as depicting the display output of the client side application 169 (FIG. 1), according to various embodiments of the present disclosure.

In one embodiment, the jukebox service 119 (FIG. 1) generates the network page 173a to depict a homepage for a user 125 (FIG. 1) on the client 106 to establish a jukebox 133 (FIG. 1). As shown, the network page 173a, depicts a description field 203, a location field 204, a date field 206, a time field 209, a content control field 210, a disc jockey setup area 211, and an establish button 226. In one embodiment, the user 125 creating the jukebox 133 may provide a description in the description field 203 such as, for instance, a name of the jukebox 133, a summary of the type of media being transmitted by the jukebox 133, a summary of the type of other users 125 being invited to consume the transmitting media, and/or any other description. Further, the user 125 may establish a location where the jukebox 133 may operate by indicating an address, a geographical area, and/or any other indicator for establishing a location. Additionally, the user 125 may indicate a date and time of the proposed jukebox 133 in the date field 206 and the time filed 209, respectively.

In addition, the user 125 may indicate an amount of content to be included in the proposed jukebox 133 with the content control field 210. In one embodiment, the user 125 may select the amount of content using a sliding bar included in the content control field 210. As shown in this example, the amount of content served up by the jukebox 133 may be indirectly related to the number of users that are able to consume the content. For instance, as discussed above, the files 129 (FIG. 1) may be protected property of the respective IP owners 157 (FIG. 1) that permit the public consumption of the files 129 as per the license agreement 158 (FIG. 1). In one embodiment, files 129 that may be freely consumed and/or require a negligible payment to the IP owner 157 may be consumed by a larger number of users 125 than files 129 that require a higher amount of payment to the IP owner 157, as can be appreciated. Additionally, the number of files 129 that may be freely consumed and/or require a negligible payment to the IP owner 157 may be less than the number of files 129 that require a higher amount of payment to the IP owner 157, as can be appreciated.

Next, in the disc jockey setup area 211, the user 125 may indicate a preferred approach for determining the disc jockey 163 (FIG. 1). As shown in this example, the network page 173a may include a select from users button 213, a vote button 216, a random button 219, and a round robin button 223. In one embodiment, the user 125 creating the jukebox 133 may toggle the select from users button 213 for selecting a disc jockey 163 from the users 125 consuming the transmitting media, the vote button 216 for selecting the disc jockey 163 from a vote amongst the users 125, the random button 219 for selecting the disc jockey 163 at random from the amongst the users 125, and the round robin button 223 for allowing each one of the users 125 a turn as the disc jockey 163 for a duration of time. Finally, toggling the establish button 226 may establish the jukebox 133, as described above.

Figure 3:
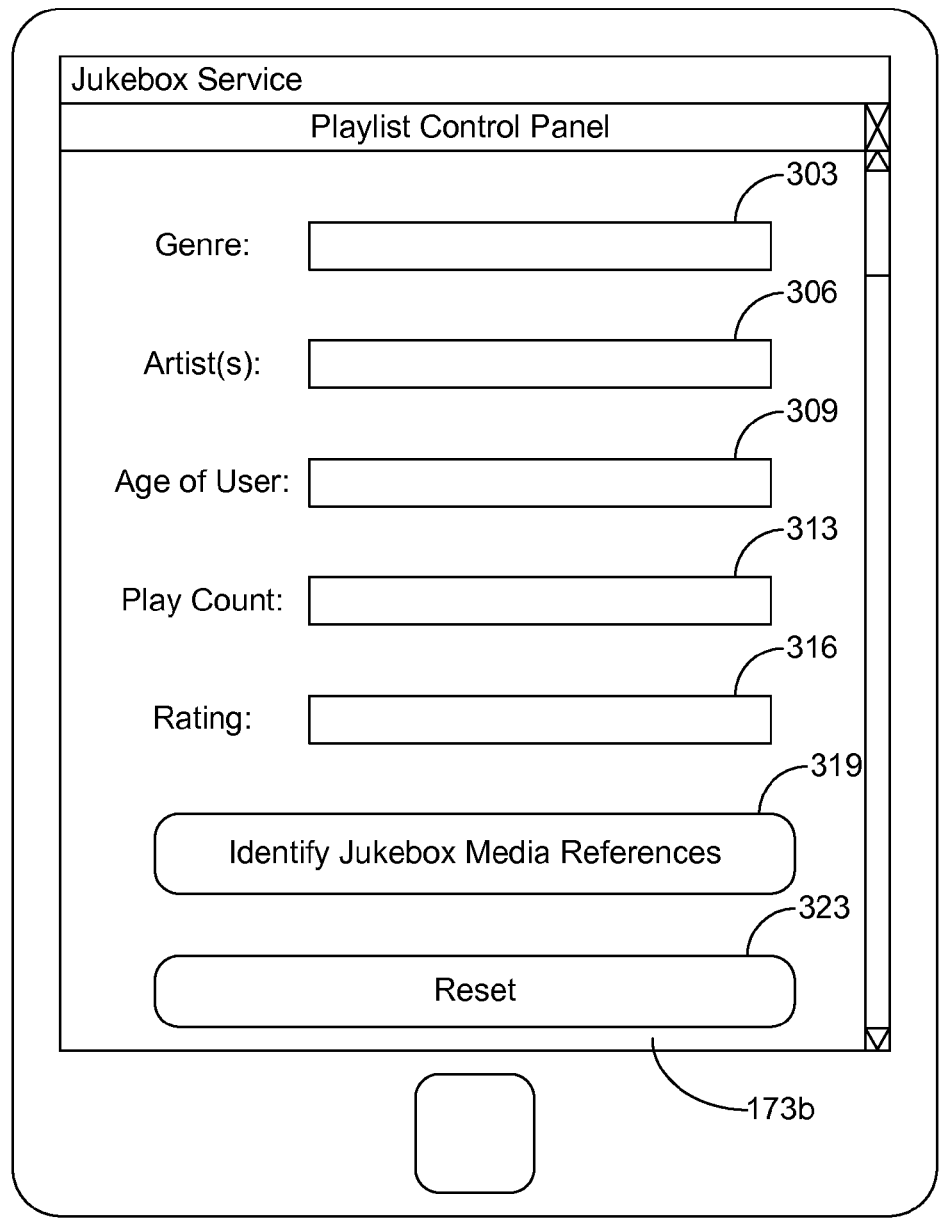

Turning now to FIG. 3, shown is one example of a network page 173, depicted herein as network page 173b, according to various embodiments of the present disclosure. The various graphical components such as blocks comprising information shown in FIG. 3 are merely examples of the various types of features that may be used to accomplish the specific function noted. The network page 173b is rendered on a display 176 (FIG. 1) associated with the client 106 (FIG. 1) according to various embodiments. In another embodiment, FIG. 3 may be viewed as depicting the display output of the client side application 169 (FIG. 1), according to various embodiments of the present disclosure.

In one embodiment, the jukebox service 119 generates the network page 173b to depict a homepage for a disc jockey 163 (FIG. 1) on the client 106 for providing a plurality of disc jockey preferences 166 (FIG. 1). As shown, the network page 173b may include a plurality of files for the disc jockey 163 to provide the disc jockey preferences 166, such as, for instance, a genre field 303, an artist field 306, an age field 309, a play count field 313, and a rating field 316. In addition, the network page 173b may also include an identify button 319, and a reset button 323.

According to one embodiment, the disc jockey 163 may provide disc jockey preferences 166 for identifying the jukebox media references 153 (FIG. 1), such as, for instance, a genre for a type of music in the genre field 303, one or more artists in the artist field 306, an average age of a user for selecting files 129 in the age field 309, a play frequency and/or a cumulative play count in the play count field 313, and a desired star rating in the rating field 316. In addition, other fields for providing other disc jockey preferences 166, as described above, may also be included in network page 173b. Further, toggling the identify button 319 may submit the disc jockey preferences 166 to the jukebox service 119 for identifying the jukebox media references 153 pointing to files 129 of the file systems 126 (FIG. 1). Additionally, toggling the reset button 323 may reset any of the fields of network page 173b to be clear of any input.

Figure 4:
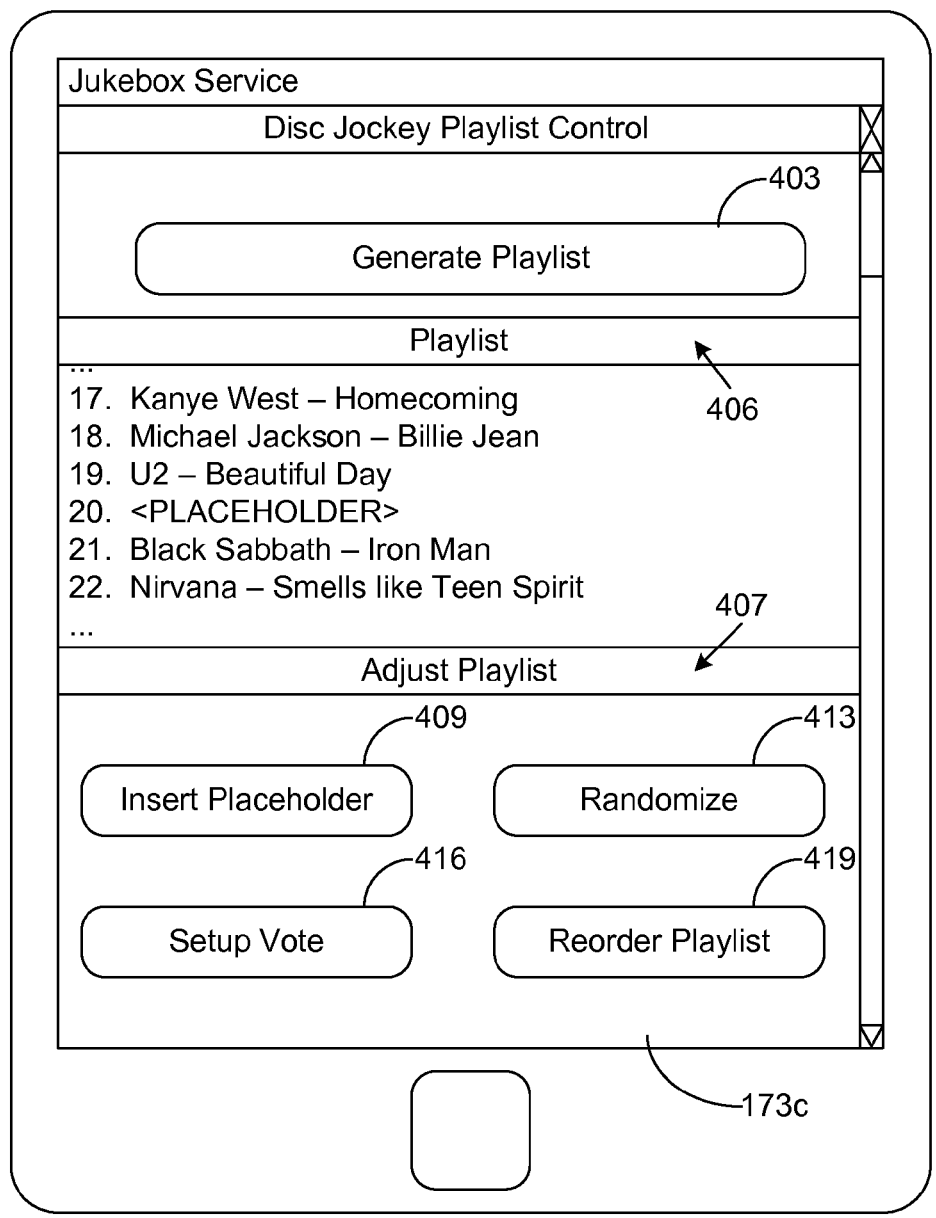

Moving on to FIG. 4, shown is one example of a network page 173, depicted herein as network page 173c, according to various embodiments of the present disclosure. The various graphical components such as blocks comprising information shown in FIG. 4 are merely examples of the various types of features that may be used to accomplish the specific function noted. The network page 173c is rendered on a display 176 (FIG. 1) associated with the client 106 (FIG. 1) according to various embodiments. In another embodiment, FIG. 4 may be viewed as depicting the display output of the client side application 169 (FIG. 1), according to various embodiments of the present disclosure.

In one embodiment, the jukebox service 119 (FIG. 1) generates the network page 173c to depict a playlist control page for a disc jockey 163 (FIG. 1) on the client 106 for managing a jukebox playlist 149 (FIG. 1). As shown, the network page 173c may include a generate playlist button 403, a playlist box 406, and a playlist control box 407. In one embodiment, the jukebox service 119 generates the jukebox playlist 149 when the disc jockey 163 toggles the generate playlist button 403. The generated jukebox playlist 149 may then appear in the playlist box 406, as shown in network page 173c.

In addition, the playlist control box 407 may include a plurality of control options for the disc jockey 163 to manage the jukebox playlist 149. For instance, the playlist control box 407 may include a placeholder button 409, a randomize button 413, a setup vote button 416, and reorder playlist button 419. In one embodiment, the jukebox service 119 may insert a placeholder in the jukebox playlist 149 at a desired location when the placeholder button 409 is toggled, and randomize the order of the jukebox media references 153 when the randomize button 413 is toggled. In addition, when the setup vote button 416 is toggled, the jukebox service 119 may setup a vote by the users 125 (FIG. 1) consuming the transmitting media for a jukebox playlist 149 management task, such as, for instance, inclusion of a new jukebox media reference 153, as described above. Finally, toggling the reorder playlist button 419 may provide for the disc jockey 163 for adjusting an order of the jukebox media references 153 in the jukebox playlist 149, as described above.

Figure 5:
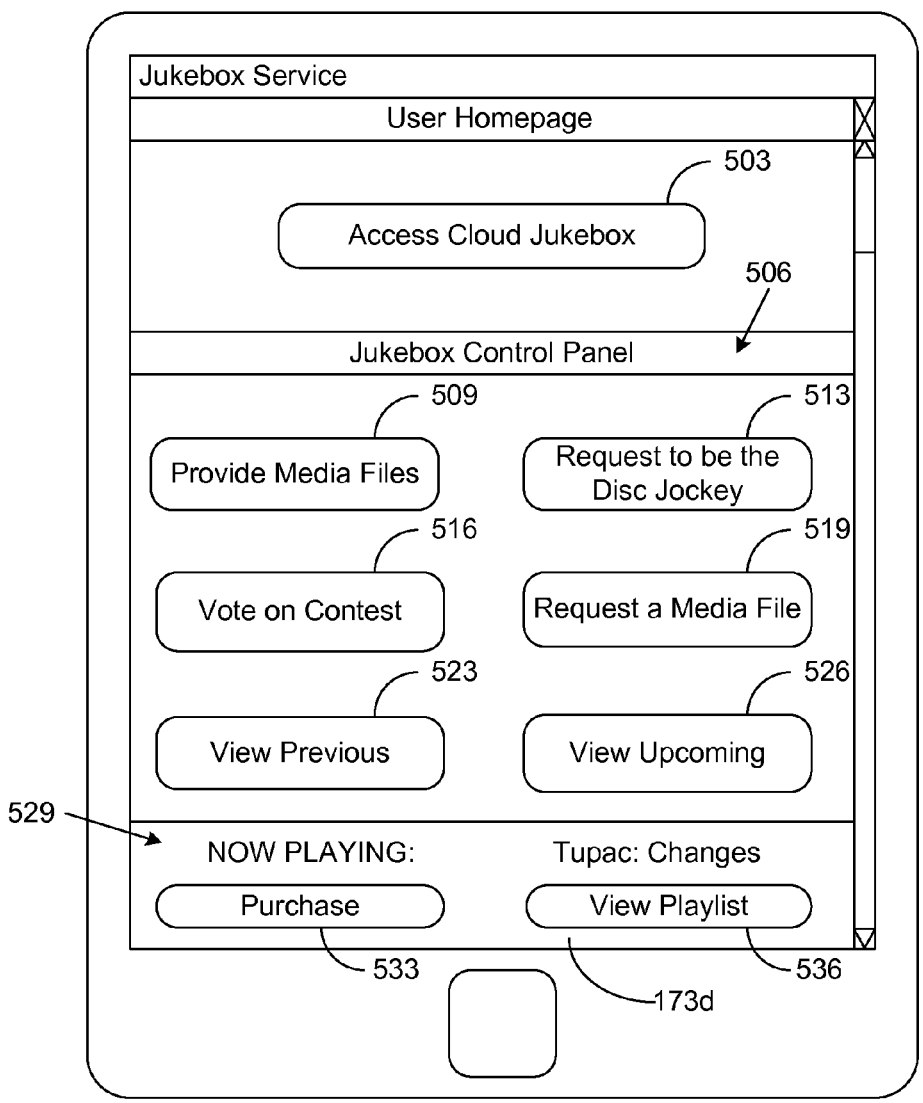

Referring now to FIG. 5, shown is one example of a network page 173, depicted herein as network page 173d, according to various embodiments of the present disclosure. The various graphical components such as blocks comprising information shown in FIG. 5 are merely examples of the various types of features that may be used to accomplish the specific function noted. The network page 173d is rendered on a display 176 (FIG. 1) associated with the client 106 (FIG. 1) according to various embodiments. In another embodiment, FIG. 5 may be viewed as depicting the display output of the client side application 169 (FIG. 1), according to various embodiments of the present disclosure.

In one embodiment, the jukebox service 119 (FIG. 1) generates the network page 173d to depict a homepage for a user 125 (FIG. 1) on the client 106 that is in electronic communication with the jukebox service 119. As shown, the network page 173d may include an access button 503, a jukebox control panel box 506, and a now playing box 529. In one embodiment, toggling the access button 503 may transmit a request to the jukebox service 119 to access the media being transmitted by the jukebox service 119, as described above.

Next, the jukebox control panel box 506 provides for the user 125 to participate in the transmitting of the files 129 referenced by the jukebox media references 153 (FIG. 1) by the jukebox service 119. As shown in network page 173d, the jukebox control panel box 506 includes a provide media files button 509, a request to be disc jockey button 513, a vote button 516, request media file button 519, view previous button 523, and a view next button 526. In one embodiment, toggling the provide media files button 509 provides access to the files 129 (FIG. 1) of a file system 126 (FIG. 1) associated with the user 125 to the jukebox service 119. Next, toggling the request to be disc jockey button 513 transmits a request to the jukebox service 119 for the user 125 to serve as the disc jockey 163 (FIG. 1).

Further, toggling the vote button 516 provides for the user 125 to vote on any contests being administered by the jukebox service 119. For example, the jukebox service 119 may allow all the users 125 consuming the transmitting media to vote on a next jukebox media reference 153 pointing to a file 129 to be transmitted, as described above. In addition, toggling the request media file button 519 provides for the user 125 to transmit a request to the jukebox service 119 to transmit a specific referenced file 129, as described above. Next, toggling the view previous button 523 and the view next button 526 may allow the user 125 to view a name of the referenced file 129 previously transmitted and the name of the referenced file 129 to be transmitted next, respectively.

Finally, the now playing box 529 may depict the name of a referenced file 129 being currently transmitted by the jukebox service 119. In addition, a purchase button 533 included in the now playing box 529 may be toggled to transmit a request to the electronic commerce application 116 (FIG. 1) to initiate a purchase of the referenced file 129 being currently transmitted. For example, network pages 173 or other user interfaces may be presented to consummate the purchase as can be appreciated. Additionally, a view playlist button 536 included in the now playing box 529 may be toggled to transmit a request to the jukebox service 119 to view the jukebox playlist 149 (FIG. 1).

Figures 6, 7:
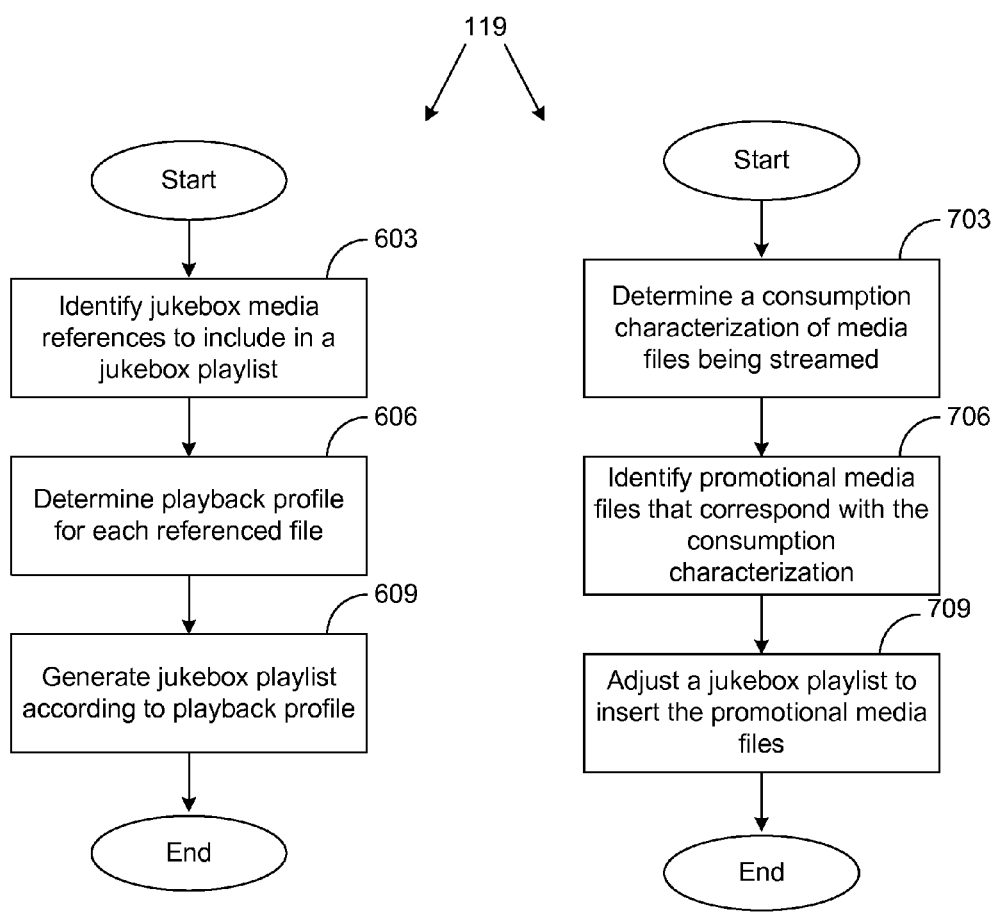
FIGS. 6 and 7 are flowcharts illustrating one example of functionality implemented as portions of a jukebox service executed in a computing device in the networked environment of FIG. 1 according to various embodiments of the present disclosure.

Referring next to FIG. 6, shown is a flowchart that provides one example of the operation of a portion of the jukebox service 119 according to various embodiments. It is understood that the flowchart of FIG. 6 provides merely an example of the many different types of functional arrangements that may be employed to implement the operation of the portion of the jukebox service 119 as described herein. As an alternative, the flowchart of FIG. 6 may be viewed as depicting an example of steps of a method implemented in the computing device 103 (FIG. 1) according to one or more embodiments.

In one embodiment, the jukebox service 119 identifies a plurality of jukebox media references 153 (FIG. 1) that point to files 129 (FIG. 1) of file systems 126 (FIG. 1) associated with a plurality of users 125 in electronic communication with the jukebox service 119 to include in a jukebox playlist 149 (FIG. 1). The jukebox service 119 then generates the jukebox playlist 149 according to a playback profile 156 (FIG. 1) of the files 129 being referenced by the jukebox media references 153 and transmits the referenced files 129 to the users 125.

Beginning with box 603, the jukebox service 119 identifies the jukebox media references 153 that are to be included in a jukebox playlist 149. In one embodiment, the jukebox service 119 identifies the jukebox media references 153 according to a plurality of disc jockey preferences 166 provided by the disc jockey 163. For example, the disc jockey preferences 166 may comprise a genre of music, a name of an artist, a star rating of a song, and/or any other preferences for identifying jukebox media references 153, as described above. The jukebox service 119 may then identify files 129 of a file system 126 associated with each of the users 125 that correspond with the disc jockey preferences 166 to reference in the jukebox media references 153, as described above.

Next, in box 606, the jukebox service 119 determines a playback profile 156 for the files 129 being referenced by the jukebox media references 153. In embodiment, the playback profile 156 comprises a playback frequency, a cumulative number of playbacks, a most frequent time of playback, and/or any other attribute associated with the playback of the referenced files 129, as described above. The jukebox service 119 may determine the playback profile 156 based on a statistical analysis, as can be appreciated.

Then, in box 609, the jukebox service 119 generates the jukebox playlist 149 according to the playback profile 156. In one embodiment, the jukebox service 119 may generate the jukebox playlist 149 such that the order of the jukebox media references 153 corresponds with the playback profile 156 of each one of the referenced files 129. For instance, the jukebox service 119 may transmit referenced files 129 having a higher degree of playback frequency more frequently than referenced files 129 having a lesser degree of playback frequency, as described above. In addition, the jukebox service 119 may allow the users 125 consuming the transmitting referenced files 129 to provide input on an order for the jukebox playlist 149, as described above.

Referring next to FIG. 7, shown is a flowchart that provides one example of the operation of a portion of the jukebox service 119 according to various embodiments. It is understood that the flowchart of FIG. 7 provides merely an example of the many different types of functional arrangements that may be employed to implement the operation of the portion of the jukebox service 119 as described herein. As an alternative, the flowchart of FIG. 7 may be viewed as depicting an example of steps of a method implemented in the computing device 103 (FIG. 1) according to one or more embodiments.

In one embodiment, the jukebox service 119 provides for a media promoter to micro-target an audience based on a characterization of the files 129 consumed by the audience. For example, the jukebox service 119 determines the characterization of the files 129 consumed by the users and identifies promotional media files that align with the characterization. The jukebox service 119 may then provide for the media promoter to adjust the transmitting media to include the identified promotional media files for consumption by the users.

Beginning with box 703, the jukebox service 119 determines a characterization of the files 129 (FIG. 1) referenced by the jukebox media referenced 153 (FIG. 1) being transmitted by the jukebox service 119. In one embodiment, the characterization may comprise an artist most commonly appearing in the jukebox playlist 149 (FIG. 1), a general tempo of the referenced files 129, and/or any other characterization of the files 129 being referenced by the jukebox media references 153. Additionally, in one embodiment, the characterization may be substantially similar to the disc jockey preferences 166 (FIG. 1) provided by the disc jockey 163 (FIG. 1) and the playback profile 156 (FIG. 1) used to generate the jukebox playlist 149 (FIG. 1).

Next, in box 706, the jukebox service 119 identifies promotional files 129 that align with the characterization. In one embodiment, the promotional files 129 may be identified from a file system 126 associated with the media promoter. The jukebox service 119 may select one or more of the promotional files 129 that correspond with at least one attribute of the characterization to include as a jukebox media reference 153 in the jukebox playlist 149, as described above.

Finally, in box 709, the jukebox service 119 adjusts the jukebox playlist 149 to include the promotional jukebox media references 153 that point to the promotional files 129 identified in box 706. In one embodiment, the jukebox service 119 may insert the promotional jukebox media references 153 at a random location in the jukebox playlist 149, and/or at a previously established placeholder in the jukebox playlist 149, as described above.

Figure 8:
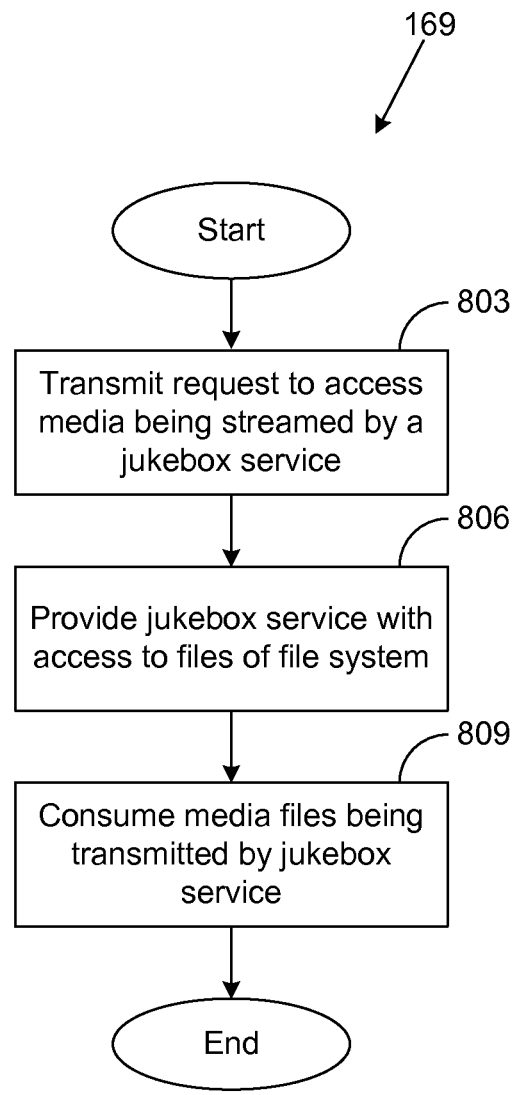
FIG. 8 is a flowchart illustrating one example of functionality implemented as portions of a client side application executed in a client device in the networked environment of FIG. 1 according to various embodiments of the present disclosure.

Referring next to FIG. 8, shown is a flowchart that provides one example of the operation of a portion of the client side application 169 according to various embodiments. It is understood that the flowchart of FIG. 8 provides merely an example of the many different types of functional arrangements that may be employed to implement the operation of the portion of the client side application 169 as described herein. As an alternative, the flowchart of FIG. 8 may be viewed as depicting an example of steps of a method implemented in the client 106 (FIG. 1) according to one or more embodiments.

In one embodiment, the client side application 169 communicates with the jukebox service 119 (FIG. 1) of a computing device 103 (FIG. 1) to receive a plurality of referenced files 129 (FIG. 1) being transmitted by the jukebox service 119. Upon requesting access to the transmitting media, the client side application 169 then provides the jukebox service 119 with access to the files 129 (FIG. 1) of a file system 126 (FIG. 1) associated with the user 125 (FIG. 1) on the client 106. In response, the client side application 169 then receives the transmitting media for consumption by the user 125.

Beginning with box 803, the client side application 169 transmits a request to the jukebox service 119 for access to the referenced files 129 being transmitted by the jukebox service 119. In one embodiment, the jukebox service 119 may verify that the request is being received from a client 106 located within a radius of a previously determined location. For example, the jukebox service 119 may verify the location of the client 106 using a quick response code, a passphrase, a geographic location, and/or any other approach, as described above.

Next, in box 806, the client side application 169 provides the jukebox service 119 with access to the files 129 of the file system 126 associated with the user 125. In one embodiment, the client side application 169 may be required to provide this access to the files 129 in order to receive the transmitting media. Finally, in box 809, the client side application 169 receives the files 129 being transmitted by the jukebox service 119 in response to the access to the files 129.

Figure 9:
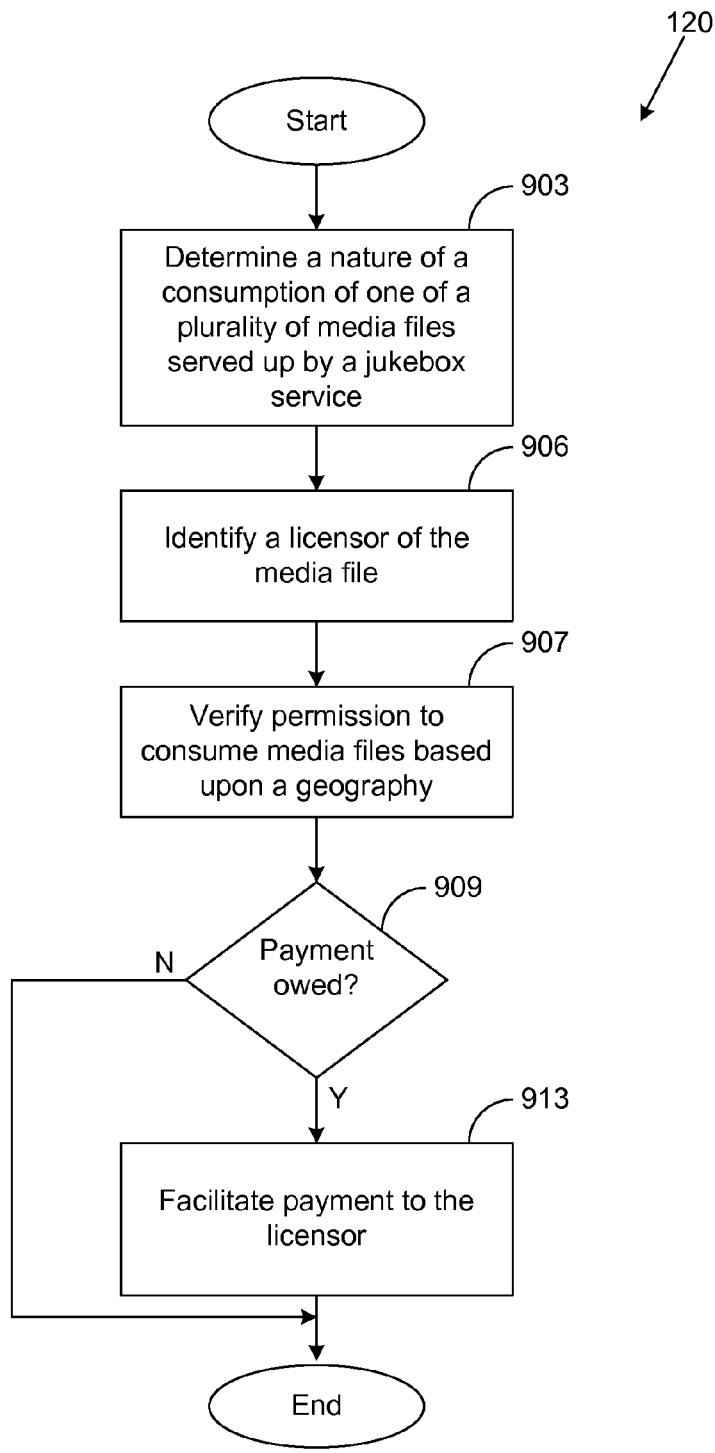
FIG. 9 is a flowchart illustrating one example of functionality implemented as portions of a license service executed in a computing device in the networked environment of FIG. 1 according to various embodiments of the present disclosure.

Referring next to FIG. 9, shown is a flowchart that provides one example of the operation of a portion of the license service 120 according to various embodiments. It is understood that the flowchart of FIG. 9 provides merely an example of the many different types of functional arrangements that may be employed to implement the operation of the portion of the license service 120 as described herein. As an alternative, the flowchart of FIG. 9 may be viewed as depicting an example of steps of a method implemented in the computing device 103 (FIG. 1) according to one or more embodiments.

Beginning with box 903, the license service 120 determines a nature or type of a consumption of one of a plurality of media files 129 (FIG. 1) served up by a jukebox service 119 (FIG. 1). In one embodiment, the license service 120 may first determine whether a file 129 has been served up for consumption by the jukebox service 120 (FIG. 1). For instance, the license service 120 may determine that a file 129 has been served up if the jukebox playlist 149 (FIG. 1) indicates that the file 129 has been queued for consumption. In this example, the license service 120 determines that the file has been served up when the file 129 is queued up to the top of the jukebox playlist 149, as discussed above. Alternatively, the license service 120 may determine that the file has been served up when the file 129 is transmitted to the users 125 (FIG. 1), as discussed above. Next, the license service 120 determines the nature of the consumption of the served up media file 129. For instance, the media file 129 may be served up for listening, downloading, purchasing, and/or any other form of consumption.

Next, in box 906, the license service 120 identifies the licensor of the media file 129. In one embodiment, the licensor is the IP owner 157 (FIG. 1) of the file 129. For instance, the IP owner 157 may own a copyright and/or another form of intellectual property protection for the file 129. The IP owner 157 may have entered into any agreement 158 (FIG. 1) under which the IP owner 157 grants permission for enabling the public consumption of the file 129 in exchange for compensation. For instance, the agreement 158 may be a flat fee license agreement, a per use license agreement, and/or any other type of license agreement, as discussed above. In one embodiment, the license service 120 identifies the IP owner 157 from the data store 113 where the identifying information of the IP owner 157 is stored in association with the file 129.

Then, in box 907, the license service 120 may receive a verification from the jukebox service 119 (FIG. 1) that the users 125 consuming the files 129 are within a geographical scope specified by the creator of the jukebox 133 (FIG. 1). In one embodiment, the jukebox service 119 may first verify that the users 125 accepting the invitations are located within the predetermined radius or distance of the specified location. For example, verification using a quick response code, a location based approach, a protected passphrase, and/or any other verification approach may be used as can be appreciated. As a further example, the jukebox service 119 may use a verification approach as described in U.S. patent application Ser. No. 13/217,324, entitled "Authentication Using Media Fingerprinting" filed on Aug. 25, 2011, which is incorporated herein by reference in its entirety. In one embodiment, the license service 120 may facilitate the payment to the IP owner 157 if the users 125 are within the specified geographical scope.

In box 909, the license service 120 determines whether a payment is owed to the IP owner 157 according to the agreement 158. For instance, the agreement 158 may indicate that the licensor receive a payment for each type of consumption, such as, for instance, listening to the media file 129, downloading the media file 129, and/or any other type of consumption. In another embodiment, the agreement 158 may indicate that the licensor receive a flat fee regardless of a number of instances of consumption. In this example, a payment may not be owed to the licensor if the licensor has already received the flat fee payment. In a further embodiment, the agreement 158 may indicate that the licensor receive a payment based on an amount of the media file 129 consumed by the user 125. For instance, the licensor may receive a payment for every thirty seconds of a song listened to by the user 125, as discussed above. In this instance, the license service 120 may continually determine whether a payment is owed to the IP owner 157 throughout the consumption of the media file 129.

If the license service 120 determines that a payment is owed to the licensor, then in box 913, the license service 120 facilitates the payment to the licensor. In one embodiment, the license service 120 may serve up a plurality of network pages 173 (FIG. 1) to the users 125 (FIG. 1) consuming the files 129. The network pages 173 may prompt the users 125 to provide payment information. Alternatively, the license service 120 may process the payment using previously established payment instrument information of the user 125.

Additionally, the license service 120 may also charge the respective payment amount to an account associated with the user 125 that may be paid by the user 125 at a later time. In another embodiment, the license service 120 may facilitate the payment to the licensor from another source, such as, for instance, a provider of the jukebox 133 (FIG. 1), an owner of the jukebox 133, the disc jockey 163 (FIG. 1) managing the jukebox 133, and/or any other source. Finally, returning to box 909, if the license service 120 determines that a payment is not owed to the licensor, then the license service 120 ends as no payment is needed.

Figure 10:
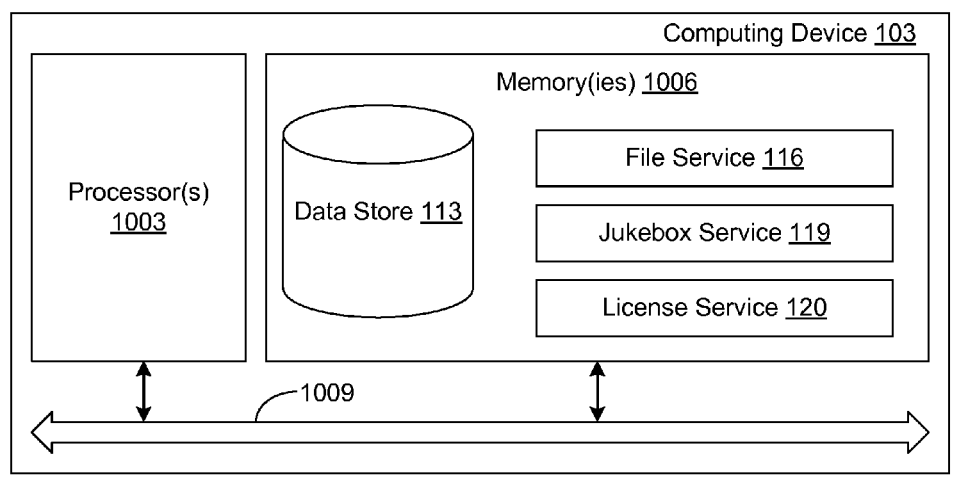
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are a file service 116, a jukebox service 119, a license service 120 and potentially other applications. Also stored in the memory 1006 may be a data store 113 and other data. In addition, an operating system may be stored in the memory 1006 and executable by the processor 1003.

It is understood that there may be other applications that are stored in the memory 1006 and are executable by the processors 1003 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, ActionScript, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 109 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the file service 116, the jukebox service 119, the license service 120 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6, 7, 8, and 9 show the functionality and operation of an implementation of portions of the jukebox service 119, the client side application 169, and the license service 120, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 6-9 show a specific order of execution, it is understood that the order of execution may differ from that which is depicted. For example, the order of execution of two or more blocks may be scrambled relative to the order shown. Also, two or more blocks shown in succession in FIGS. 6-9 may be executed concurrently or with partial concurrence. Further, in some embodiments, one or more of the blocks shown in FIGS. 6-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the file service 116, the jukebox service 119, and the license service 120 that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:
   communicate, to a plurality of clients associated with a plurality of users, a request for access by a jukebox service to a plurality of file systems of the plurality of clients;
   verify that individual ones of the plurality of clients are located within a predefined radius from a user-specified location based at least in part on a detection of a quick response code being scanned by the individual ones of the plurality of clients, the quick response code being associated with the jukebox service and positioned at a respective location within the predefined radius, the user-specified location being received from a user interface associated with the jukebox service;
   enable, with the jukebox service, a public consumption of one of a plurality of media files for the plurality of clients by serving up at least the one of the plurality of media files from a remote data store associated with at least one of the file systems of at least one of the plurality of clients granting access in response to the request for access, wherein the public consumption is enabled based at least in part on the verification of the individual ones of the plurality of clients being within the predefined radius;
   determine whether the public consumption corresponds to at least one of a plurality of natures of consumption, wherein the plurality of natures of consumption comprise a download, a purchase, and an execution of the one of the plurality of media files, wherein each of the plurality of natures of consumption is associated with a different payment amount;
   identify an owner of a plurality of intellectual property rights of the plurality of media files, wherein the owner owns a copyright of the plurality of media files and permits the public consumption of the plurality of media files according to an agreement, the agreement comprising at least one of a flat fee license agreement or a per use license agreement; and
   generate a payment owed to the owner for the public consumption of the one of the plurality of media files based at least in part on the different payment amount corresponding to each of the plurality of natures of consumption associated with the plurality of media files.

2. The non-transitory computer-readable medium of claim 1, wherein the program, when executed, further causes the computing device to facilitate serving up an advertisement provided by the owner to the plurality of users.

3. The non-transitory computer-readable medium of claim 2, wherein the advertisement is served up to the plurality of users in exchange for a permission to enable the public consumption of at least the one of the plurality of media files.

4. A system comprising:
   a data store; and
   a computing device in communication with the data store, the computing device configured to at least:
      communicate, to a plurality of clients associated with a plurality of users, a request for access by a jukebox service to a plurality of file systems of the plurality of clients;
      verify that individual ones of the plurality of clients are located within a predefined radius from a user-specified location based at least in part on a detection of a quick response code being scanned by the individual ones of the plurality of clients, the quick response code being associated with the jukebox service and positioned at a respective location within the predefined radius, the user-specified location being received from a user interface associated with the jukebox service;
      enable a consumption of one of a plurality of media files for the plurality of clients by serving up the one of the plurality of media files with the jukebox service to the plurality of users in communication with the jukebox service, wherein the plurality of media files are stored on at least one of the file systems of at least one of the plurality of clients granting access in response to the request for access, wherein the consumption is enabled based at least in part on the verification of the individual ones of the plurality of clients being within the predefined radius;

determine a nature of the consumption of the one of the plurality of media files;

identify a licensor of the one of the plurality of media files and an agreement associated with the licensor defining a payment amount corresponding to the nature of the consumption;

determine whether a payment to the licensor is owed for the consumption of the one of the plurality of media files based at least in part on the payment amount associated with the nature of the consumption; and responsive to the determination that the payment is owed, facilitate the payment to the licensor.

5. The system of claim 4, wherein the nature of the consumption comprises at least one of purchasing, renting, playing, or downloading.

6. The system of claim 5, wherein the computing device configured to determine whether the payment to the licensor has been fulfilled is further configured to at least:

identify a type of a license agreement with the licensor for facilitating the consumption of the one of the plurality of media files; and determine whether the license agreement indicates that the licensor receives the payment upon the consumption of the one of the plurality of media files for the determined nature of the consumption.

7. The system of claim 6, wherein the type of the license agreement comprises one of a flat fee license agreement, a per use license agreement, or a subscription agreement.

8. The system of claim 4, wherein the computing device is further configured to transmit at least one of the plurality of media files to a client device for the consumption in a public environment.

9. The system of claim 4, wherein the computing device is further configured to transmit at least one of the plurality of media files to another computing device for the consumption in a remote jukebox environment by the jukebox service.

10. The system of claim 4, wherein the computing device configured to determine whether a media file has been consumed is further configured to determine whether a media file listed in a media playlist has been transmitted to another computing device for the consumption.

11. The system of claim 4, wherein the computing device is further configured to transmit an advertisement.

12. A computer-implemented method comprising:

communicating, from a computing device, to a plurality of clients associated with a plurality of users, a request for access by a jukebox service to a plurality of file systems of the plurality of clients;

verifying, from the computing device, that individual ones of the plurality of clients are located within a predefined radius from a user-specified location based at least in part on a detection of a quick response code being scanned by the individual ones of the plurality of clients, the quick response code being associated with the jukebox service and positioned at a respective location within the predefined radius, the user-specified location being received from a user interface associated with the jukebox service;

enabling, from the computing device, a consumption of one of a plurality of media files by serving up the one of the plurality of media files with the jukebox service to the plurality of users in communication with the jukebox service, wherein the plurality of media files are stored on at least one of the file systems of at least one of the plurality of clients granting access in response to the request for access, wherein the consumption is enabled based at least in part on the verification of the individual ones of the plurality of clients being within the predefined radius;

identifying, in the computing device, an owner of an intellectual property right for the one of the plurality of media files; and facilitating, from the computing device, a payment to the owner for enabling the consumption of the one of the plurality of media files, wherein the payment corresponds to a respective one of a plurality of payment amounts associated with a plurality of types of the consumption, wherein the plurality of payment amounts vary depending on respective ones of the plurality of types of the consumption.

13. The computer-implemented method of claim 12, further comprising determining, in the computing device, a type of agreement under which the owner permits the consumption of the one of the plurality of media files.

14. The computer-implemented method of claim 12, where facilitating the payment to the owner further comprises determining whether the payment is owed to the owner.

15. The computer-implemented method of claim 12, wherein facilitating the payment to the owner further comprises determining a nature of the consumption of the one of the plurality of media files.

16. The computer-implemented method of claim 15, wherein the nature of the consumption comprises one of a purchase, a download, or an execution of the one of the plurality of media files.

17. The computer-implemented method of claim 13, where the facilitating the payment to the owner further comprises determining whether a payment is owed to the owner based on the type of agreement.

18. The computer-implemented method of claim 13, wherein the type of agreement comprises one of a flat fee license, a per use license agreement, or a subscription agreement.

19. The computer-implemented method of claim 12, further comprising serving up an advertisement to the plurality of users provided by the owner.

20. The computer-implemented method of claim 12, further comprising determining a playlist order for the plurality of media files based at least in part on a playlist preference associated with one of the plurality of clients.

* * * * *